United States Patent [19]

Hassell

[11] Patent Number: 4,617,772

[45] Date of Patent: Oct. 21, 1986

[54] WALL PANEL JOINER

[75] Inventor: George Hassell, Coral Springs, Fla.

[73] Assignee: Jamestown Metal Marine Sales Inc., Boca Raton, Fla.

[21] Appl. No.: 619,983

[22] Filed: Jun. 12, 1984

[51] Int. Cl.[4] ............................................. E04C 1/34
[52] U.S. Cl. ...................................... 52/461; 52/468; 52/472; 52/582
[58] Field of Search ................... 52/461, 582, 465–472

[56] References Cited

U.S. PATENT DOCUMENTS

| 1,826,133 | 10/1931 | Hatch | 52/468 X |
| 1,987,498 | 1/1935 | Stolp | 52/468 X |
| 2,014,419 | 9/1935 | Voigt | 52/461 |
| 3,584,985 | 4/1971 | Pierce | 52/468 X |

FOREIGN PATENT DOCUMENTS 1166461  11/1958  France ................................. 52/461

Primary Examiner—Carl D. Friedman
Assistant Examiner—Naoko N. Slack
Attorney, Agent, or Firm—Larson & Taylor

[57] ABSTRACT

A wall panel joiner is provided for securing wall panels in edge to edge relationship. The joiner comprises a pair of clamping elements which are provided with flat outer faces, each element including a pair of spaced flanges. Locking means is provided on the flanges so that the clamping members may be secured together to retain the wall panels in edge to edge relationship. The locking means may be released only by first sliding one clamping member longitudinally with respect to the other clamping member.

5 Claims, 5 Drawing Figures

WALL PANEL JOINER

BACKGROUND OF THE INVENTION

The present invention relates to a wall panel joiner which is adapted to retain a pair of wall panels in aligned edge to edge relationship. The invention is particularly adapted for use on shipboard and the like where it is desirable to provide wall panels which may be readily assembled and disassembled.

There are many types of prior art wall panel joining devices. For example, U.S. Pat. No. 4,033,084 discloses a means for interconnecting wall panels which retains the panels in edge to edge relationship but which requires the use of retaining screws and trim plates to cover the screw heads. U.S. Pat. No. 3,858,377 discloses a means for interconnecting wall panels which does not require any screws or bolts but which does not provide any means for easily disassembling the panel members. U.S. Pat. Nos. 1,772,417 and 2,014,419 also discloses wall panel retaining members but the means for securing the retaining elements together is not sufficient to lock the members together and prevent disassembly by simply pulling one of the clamping elements away from the wall panels.

The present invention comprises a pair of clamping elements each of said elements including a flat plate with a pair of spaced flanges extending from one surface of the flat plate. The flanges on one clamping element are spaced so as to be received between the flanges on the other clamping element in close sliding relationship. The longitudinal edges of adjacent wall boards are received within the recesses formed between the flanges and the inner surfaces of the outer edges of the flat plates. Locking means is provided on the interfittng flanges on the clamping elements which retain the clamping elements in engagement with each other and hold the wall panels in edge to edge relationship. The locking means comprises a slot on the flange of one clamping element which cooperates with a triangular tab bent outwardly from the surface of a flange on the other clamping element. When the clamping elements are brought into interfitting relationship, the triangular tabs on one flange of a clamping element spring into slots in the flange on the opposing clamping element. The elements cannnot be displaced by pulling one clamping element away from the other as the apex of the triangular tab on one clamping element engages the side of the slot in the opposing clamping element. Thus, the wall panels will be maintained in alignment with only the flat face plate visible on both sides of the wall panels. In the event it becomes necessary to disassemble the wall it is only necessary to slide one clamping member longitudinally with respect to the other clamping member so that the end portion of the slot will engage the sloped sidewall of the triangular tab and act as a cam to displace the tab from the slot so that the clamping members may be readily separated.

An object of the present invention is to provide a joiner for wall panels which comprises a pair of interfitting clamping elements which may be locked together and which cannot be displaced from each other unless one clamping member is first slid longitudinally with respect to the other clamping member.

Another object of the present invention is to provide a joiner for wall panels which comprises a pair of clamping elements including a flat plate and a pair of flanges wherein the flanges include a triangular tab on one clamping element which locks into a slot in a flange on the other clamping element.

Other objects and many of the attendant advantages of the present invention will become more readily apparent upon consideration of the following detailed description in connection with the accompanying drawings wherein:

DETAILED DESCRIPTION OF THE DRAWINGS

Figure 1:
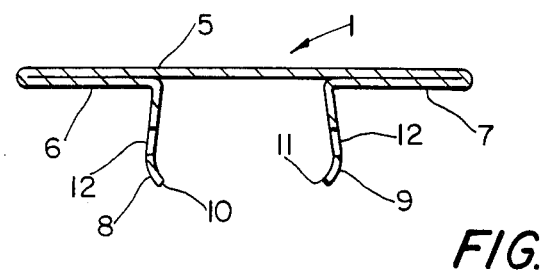
FIG. 1 is a cross sectional view of one of the clamping members.
Figure 2:
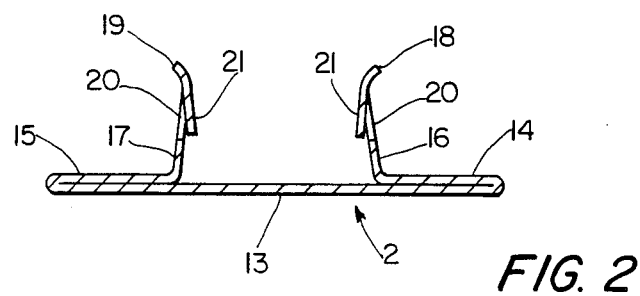
FIG. 2 is a cross sectional view of the other clamping member.
Figure 5:
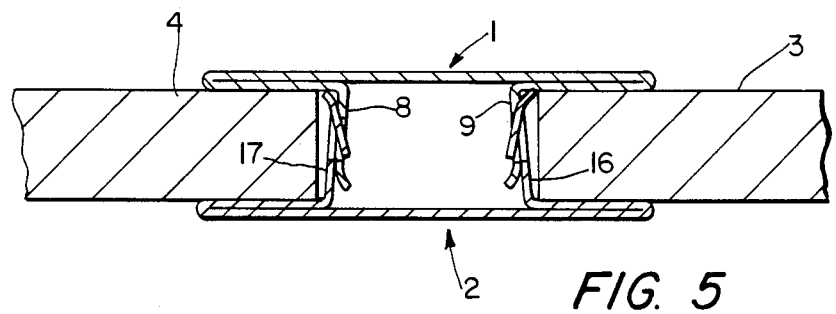
FIG. 5 is a cross sectional view showing the clamping members engaged and holding wall panels in place.

Referring now more specifically to the drawings wherein like numerals indicate like parts throughout the several views, there are shown in FIGS. 1 and 2 a pair of clamping elements 1 and 2 respectively which are adapted to be interlocked together to provide means for supporting wall panels such as shown in FIG. 5 at 3 and 4.

Each clamping element may be formed from a single metal sheet and is of a length to support the entire edge of the wall board with which it is to be used. The disclosed clamping elements have particular application for shipboard use to form partitions and in such cases the clamping elements would be of a length to extend from the floor to the ceiling structure.

Figure 3:
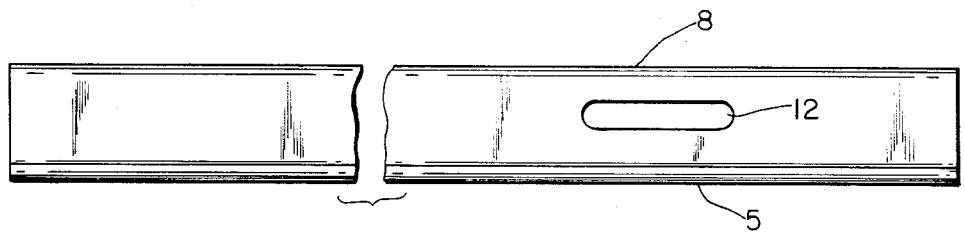
FIG. 3 is a side elevational view of the clamping member shown in FIG. 1.

The clamping element 1 comprises a flat front face 5 having the longitudinal edges of the flat front face by the sheet metal being bent through 180 degrees to form inwardly extending portions 6 and 7. The end portions 8 and 9 of the clamping member are bent so as to form flanges which extend at right angles with respect to the flat front face 5 of the clamping member. The outer ends of the flanges 8 and 9 are slightly inwardly bent as shown at 10 and 11. Each of the flanges 8 and 9 has at least one enlarged slot therein as shown at 12 in FIG. 3.

Figure 4:
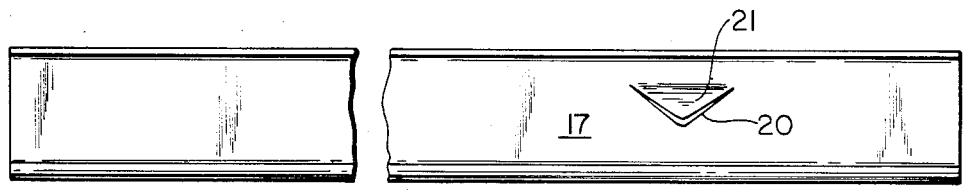
FIG. 4 is a side elevational view of the clamping member shown in FIG. 2.

The other clamping member 2 has a flat outer face 13 with the longitudinal edges of the flat face being formed by the sheet metal being bent through 180 degrees to form inwardly extending portions 14 and 15 with the end portions of the metal being bent at 90 degrees with respect to the flat front face to form flanges 16 and 17. These flanges have slightly outwardly turned edges 18 and 19. As shown in FIG. 4 the flanges 16 and 17 on clamping element 2 each have at least one V-shaped cut therein as shown at 20 to provide triangular shaped tabs 21 which are inwardly bent as more clearly seen in FIG. 2.

Most desirably the face portion 5 of the clamping element 1 is of the same width as the face portion 13 of the clamping element 2. However, the inwardly extending portion 6 and 7 of the clamping element 1 are of a width slightly greater than the inwardly extending portions 14 and 15 of the clamping element 2 so that the clamping elements 1 and 2 may be fit together in clamping relation as shown in FIG. 5 with the inner faces of flanges 16 and 17 in close sliding engagement with the outer faces of flanges 9 and 8 respectively. The inwardly extending triangular tabs 21 formed on flanges 16 and 17 of clamping element 2 engage in the slots 12 in flanges 8 and 9 so that the end portion of the triangular tab 21 extends into the slot 12 so as to engage the edge of the slot to prevent the clamping elements 1 and 2 from being pulled apart. Thus, disengagement of the clamping members 1 and 2 can only be effected by moving one of the clamping members longitudinally with respect to the other clamping member until the triangular shaped tabs 21 engage the end portions of the slots 12 to cause the tabs to move out of the slots and permit the clamping elements to be moved apart.

The clamping elements 1 and 2 may be used to retain wall elements such as shown in FIG. 5 at 3 and 4 within the recessed portions formed between the end portions of the clamping members. The interengaging tabs 21 and slots 12 ensures that the clamping elements 1 and 2 cannot become displaced inadvertently. However, in the event that it becomes necessary to dismantle the wall structure one clamping element may be moved longitudinally with respect to the other clamping member so as to cause the triangular tabs 21 to be cammed out of the slots 12 to permit disengagement of the clamping elements.

Obviously, many modifications and variations of the present invention are possible in light of the above teachings.

What is claimed as new and is desired to be secured by Letters Patent is:

1. A clamping means for securing two wallboards together to form part of a wall, said clamping means comprising a pair of clamping elements including a first clamping element having a first flat face and a pair of first spaced flanges extending at right angles to said first flat face, said first flanges being disposed in spaced relation to the longitudinal edges of said first flat face, a second clamping element having a second flat face and a pair of second spaced flanges extending at right angles to said second flat face, said second flanges being disposed in spaced relation to the longitudinal edges of said second flat face, the distance between each second flange and the adjacent longitudinal edge of said second flat face being slightly greater than the distance between each first flange and the adjacent longitudinal edge of said first flat face so that the flanges of the second clamping member fit within the flanges of the first clamping member with the flanges on said first and second clamping members being in face to face contact with each other, and means for locking said clamping elements together and permitting release of such elements only by longitudinal sliding movement of one element with respect to the other element, said locking means comprising slots on the flanges of one of said clamping elements and tabs extending from the flanges of the other of said clamping elements, said tabs being disposed within said slots when said clamping elements are locked together so that one edge of each of the slots is disposed between the inner face of each of the tabs and the surface of the flange of said other clamping element, the peripheral surface of said tabs being disposed at an angle to provide cam means to permit small longitudinal movement of said clamping elements to release the interlocked clamping elements.

2. A clamping means according to claim 1 wherein said tabs on said other element are triangular in shape and are cut out from the flange on said other element.

3. A clamping means according to claim 1 wherein said locking means comprises slots in the flanges of said second clamping element and triangular shaped bent tabs cut out in the flanges of said first clamping element.

4. A clamping means according to claim 3 wherein said triangular shaped bent tabs are formed by V-shaped cuts in the flanges of the first clamping element with the apex of the V-shaped cut being disposed adjacent the face of the second clamping element.

5. A clamping means according to claim 1 wherein said first and second clamping elements are each formed from a single piece of sheet metal with the longitudinal edges of said first clamping element being turned outwardly and the longitudinal edges of said second clamping element being turned inwardly to permit said clamping elements to be readily brought together in interlocking relationship.

* * * * *